April 7, 1953 R. W. GUNDERSON 2,633,689
VINE CUTTING AND DEFLECTING MECHANISM FOR ROW CROPS
Filed Feb. 14, 1949 3 Sheets-Sheet 1

INVENTOR
R.W. Gunderson
BY
ATTORNEYS

April 7, 1953  R. W. GUNDERSON  2,633,689
VINE CUTTING AND DEFLECTING MECHANISM FOR ROW CROPS
Filed Feb. 14, 1949  3 Sheets-Sheet 2
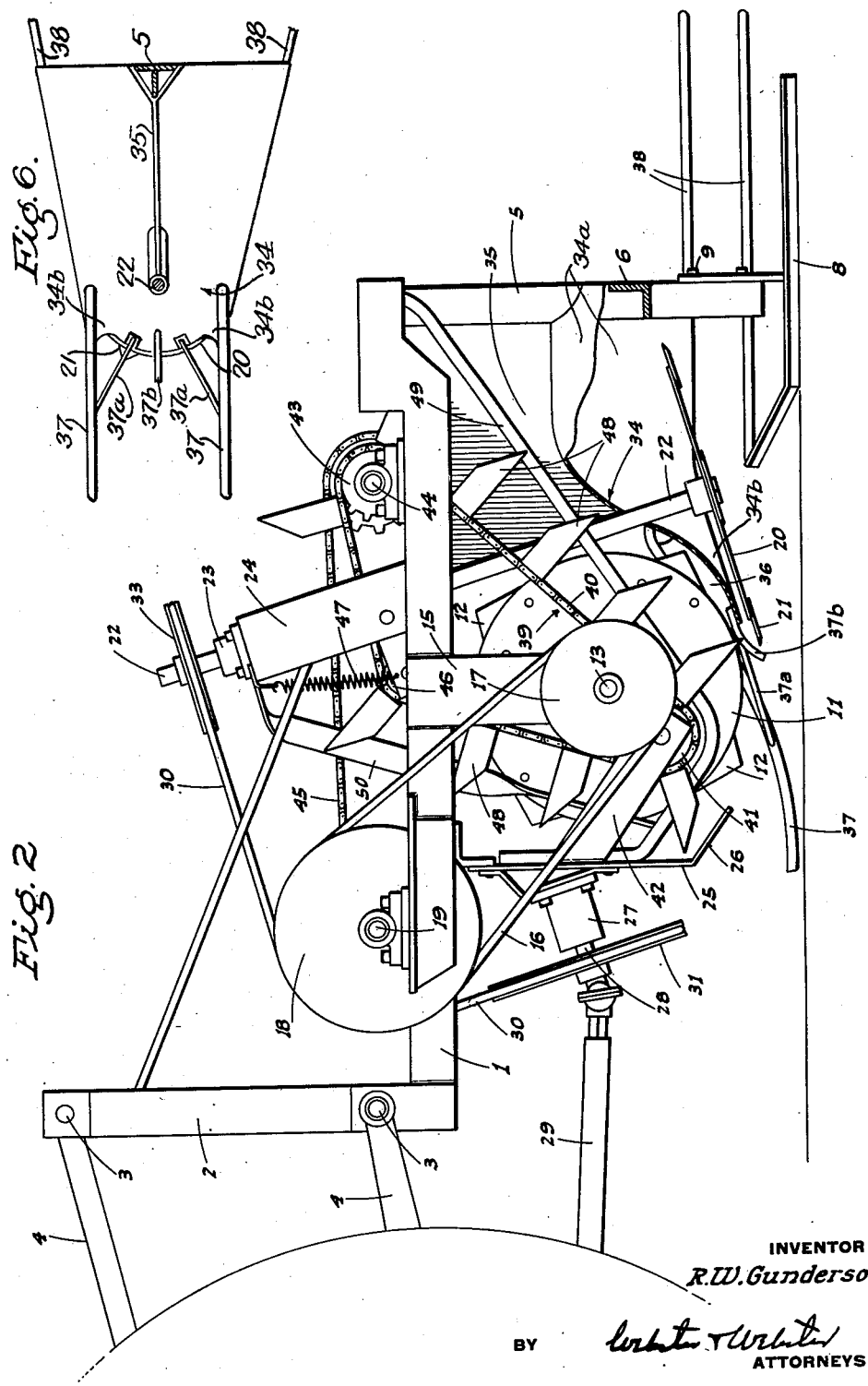
INVENTOR
R.W. Gunderson
BY
ATTORNEYS

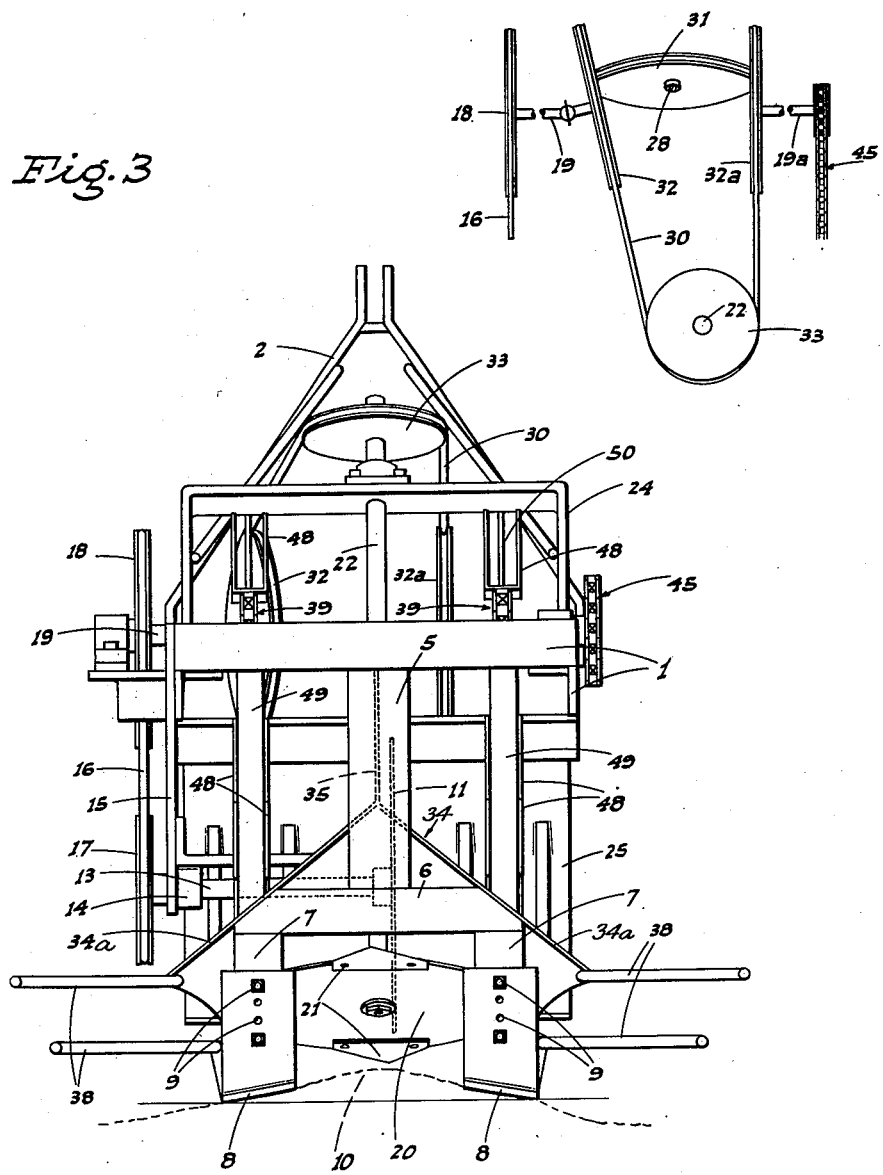

Patented Apr. 7, 1953

2,633,689

UNITED STATES PATENT OFFICE 2,633,689

VINE CUTTING AND DEFLECTING MECHANISM FOR ROW CROPS

Ralph W. Gunderson, Manteca, Calif.

Application February 14, 1949, Serial No. 76,304

4 Claims. (Cl. 56—192)

This invention is directed to, and it is an object to provide, a novel machine for severing the entangled vines of beneath-ground row crops, such as sweet potatoes, centrally and lengthwise of the row and then deflecting the severed vines laterally between the rows to clear the latter for ease and convenience of digging and harvesting the crop.

Another object of the invention is to provide a machine, for the purpose described, which includes a power driven vine cutting mechanism, and a cut vine deflecting mechanism including a power driven feeder; said mechanism being of novel construction and function.

A further object of the invention is to provide a machine, as above, which is adapted to be suspended from the power-lift device at the rear of a wheel type tractor; the driven mechanisms of the machine being actuated from a splined, universal drive shaft connected to the power take-off shaft of said tractor.

An additional object of the invention is to provide a vine cutting and deflecting machine which is designed to function smoothly, positively, and effectively as the tractor moves along a crop row in straddling relation thereto; the structure of the machine being relatively simple but rugged, and requiring a minimum of maintenance or repair.

Another object of the invention is to provide a vine cutting and deflecting machine which is designed for ease and economy of manufacture.

A still further object of the invention is to provide a practical and reliable vine cutting and deflecting machine, and one which will be exceedingly effective for the purpose for which it is designed.

These objects are accomplished by means of such structure and relative arrangement of parts as will fully appear by a perusal of the following specification and claims.

In the drawings:

Fig. 2 is an opposite side elevation of the machine; an adjacent part of the deflector hood being broken away.

Fig. 3 is a rear end view of the machine with parts removed.

Fig. 5 is a diagrammatic plan on a reduced scale of the initial belt-drive unit.

Fig. 6 is a fragmentary plan on a reduced scale showing the cutter-hood and forwardly projecting vine gathering fingers.

Figures 1, 4:
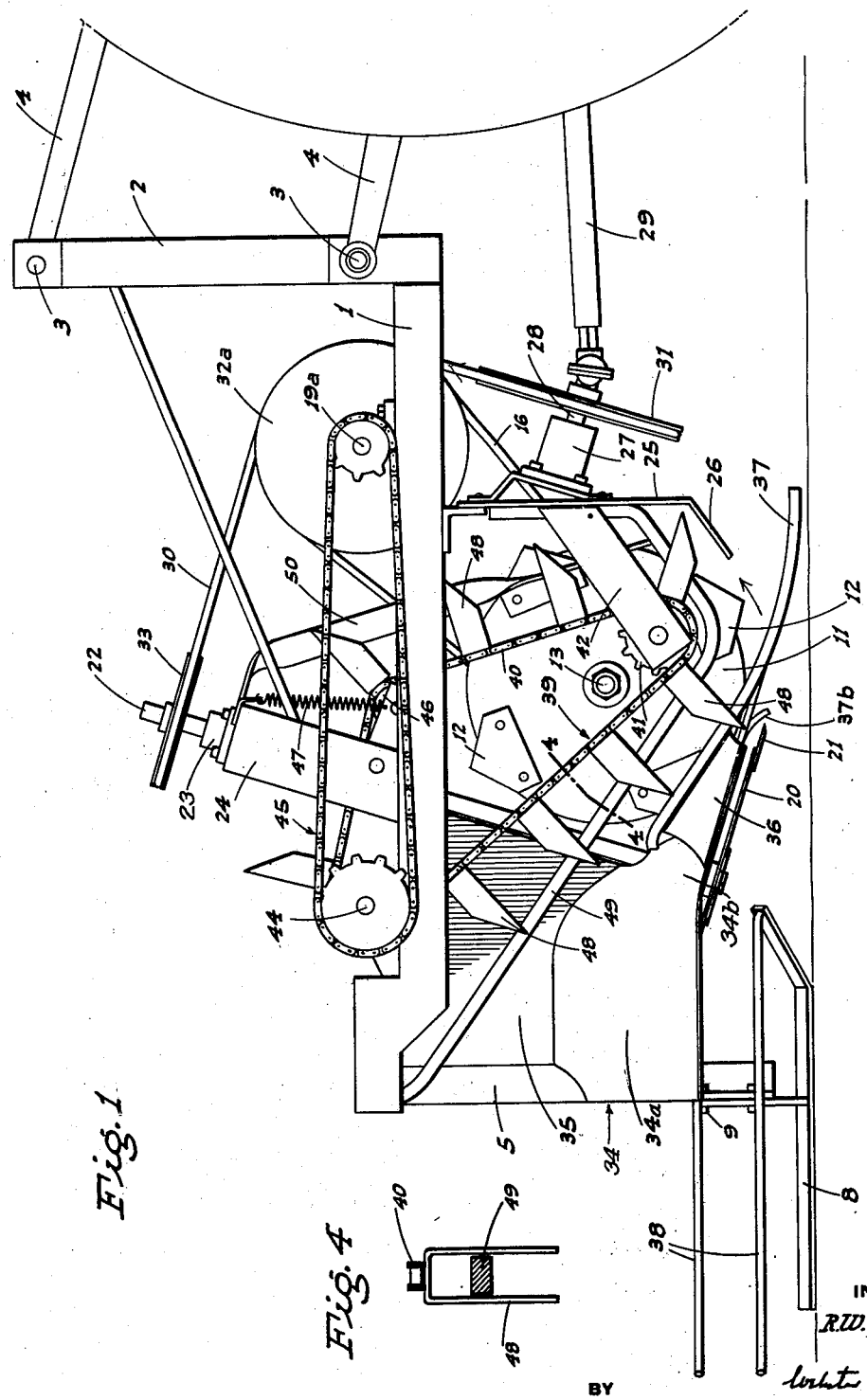
Fig. 1 is a side elevation of the machine.
Fig. 4 is a fragmentary cross section on line 4—4 of Fig. 1.

Referring now more particularly to the characters of reference on the drawings, the machine comprises an elongated, rectangular main frame I of open construction; such main frame including an upstanding A-frame 2 at the front thereof. The A-frame 2 is adapted to pivotally connect, as at 3, with the rear ends of the lift arms 4 of the power lift mechanism of a wheel type tractor. In this type of mechanism the lift arms 4 are power adjusted vertically, whereby the main frame I can be set to a selected elevation for use.

At its rear end the main frame I includes a central, downwardly projecting post 5 having a cross member 6 fixed on its lower end adjacent but above the ground. The cross member 6 is fitted, at the ends, with dependent legs 7, and a pair of corresponding, transversely spaced skids 8 are vertically adjustably secured to the legs 7, as at 9. The skids 8 have the lower surfaces thereof transversely inclined in a downward and laterally outward direction, as clearly shown in Fig. 3, whereby said skids ride opposite and sloping sides of the crop row 10; it being understood that the tractor straddles the row, with the post 5 disposed centrally thereabove.

Below the main frame I the machine is provided with a transverse axis, rotary, vine splitting or cutting disc II likewise disposed to work centrally along the crop row 10 with advance of the machine.

The vine cutting disc II is fitted, at its periphery, with a plurality of circumferentially spaced, outwardly projecting blades 12. Such vine splitting disc II is supported by a cross shaft 13, which extends through a bearing 14 on the lower end of a bracket arm 15 which depends from one side of the main frame I.

The cross shaft 13 is driven in a direction to cause the vine cutting disc II to turn forwardly at the bottom; the drive assembly including an endless belt 16 which runs between a pulley 17 on the outer end of the cross shaft 13 and another pulley 18 on the corresponding end of a cross shaft 19 journaled on the main frame I adjacent the A-frame 2, and which is driven in the manner hereinafter described.

An upstanding axis, rotary cutter 20 is disposed closely to the rear and adjacent the bottom of the transverse axis disc II; the rotary cutter 20 being pitched forwardly and downwardly so that at its front end it is disposed intermediate the ground and the bottom of said disc II.

The upstanding axis, rotary cutter 20 includes blades 21 which radiate therefrom in circumferentially spaced relation.

The rotary cutter 20 is fixed on the lower end of an upstanding shaft 22 which is disposed at a forward and upward incline through the main frame 1; such shaft being journaled by means including a bearing 23 mounted on an inverted U-shaped frame member 24 which upstands from the main frame 1. The shaft 22 lies centrally between the sides of the main frame 1 so that the rotary cutter 20 is supported with its axis in alinement with the rotary disc 11 longitudinally of the machine.

Directly ahead of the rotary disc 11 the machine is fitted with a depending transverse deflector plate 25 which includes a downwardly and rearwardly inclined flange 26 at the bottom; such flange terminating at its lower edge some distance above the forward portion of the rotary cutter 20.

At the front thereof the deflector plate 25 is fitted with a bearing 27 from which a stub shaft 28 projects forwardly; such stub shaft being driven from the tractor power take-off shaft (not shown) by means of a splined universal drive shaft 29. An endless belt 30 is driven by a pulley 31 on the stub shaft 28; such endless belt having the runs thereof extending upwardly from pulley 31 over direction-changing pulleys 32 and 32a on cross shaft 19 and a separate substantially alined shaft 19a respectively. (See Fig. 5.) From pulleys 32 and 32a the belt passes about and drives a pulley 33 on the upper end of shaft 22. In this manner belt 30 drive shafts 19 and 19a in opposite directions, as well as shaft 22, thereby rotating the splitting disc 11 and rotary cutter 20.

The post 5 at the rear end of the main frame 1 supports a forwardly projecting, inverted V-shaped deflector hood 34 having downwardly sloping sides 34a and a front portion 34b which tapers forwardly and downwardly, overhanging a major portion of the rotary cutter 20 from above; the blades 21 projecting ahead of said deflector hood 34.

A splitter plate 35 upstands centrally from the deflector hood 34 to the rear of, but longitudinally alined with, the rotary disc 11.

On opposite sides of the forward portion 34b thereof, the deflector hood 34 includes upstanding webs 36 which serve as the rigid support for longitudinal, downwardly and forwardly extending vine pick-up fingers 37; the forward portions of said fingers running substantially in ground engagement directly below the flange 26. Rearwardly extending rods 37a project from fingers 37 intermediate their ends in converging relation to a connection with the hood 34; these rods together with fingers 37 gathering in the vines and bunching them centrally in front of the cutter 20. A short finger-like deflector 37b depends from hood 34 in overhanging relation to the forward edge of cutter 20 to prevent any vines from passing between the hood and cutter.

To the rear of the vine pick-up fingers 37 the skids 8 are fitted with vertically spaced, rearwardly and outwardly diverging deflector bars 38.

Above each of the fingers 37, the machine includes an endless vine conveyor, indicated generally at 39. Each such conveyor 39 comprises an endless chain 40 mounted with a lower run thereof in position to travel rearwardly and upwardly above the corresponding vine pick-up finger 37, as shown. Each endless chain 40 turns at its lower end about a sprocket 41 journaled on a rigid arm 42 which extends rearwardly from the deflector plate 25. At its upper end each chain 40 turns about a sprocket 43 on a cross shaft 44 which is driven from the cross shaft 19a by an endless chain and sprocket unit 45.

An idler sprocket 46 cooperates with the upper run of each endless chain 40 in tightening relation thereto; such idler sprocket being urged in a chain tightening direction by a mount which includes a tension spring 47.

Vine feeding forks 48 project from each endless chain 40 in spaced relation therealong; such forks, after leaving the corresponding sprocket 41, successively sweeping up the corresponding finger 37 in straddling relation thereto.

Additionally, the vine feeding forks 48, when traveling in the lower run of each chain 40, straddle a stripper bar 49 which extends from the rear end of the main frame 1 forwardly and downwardly generally parallel to but above the corresponding finger 37, and thence each stripper bar 49 turns upwardly to connection with the deflector plate 25, helping to stabilize the latter. The lower run of each chain 40 extends at an upward and rearward incline considerably sharper than the incline of the stripper bars 49, whereby the vine feeding forks 49 progressively rise relative to said bar, finally turning free of the same.

In order to maintain the vine feeding forks 48 in proper alinement as they travel with the upper runs of the endless chain 40 intermediate the sprockets 46 and sprockets 41, the machine includes upstanding guides 50 which said forks straddle; such guides increasing in width toward the bottom whereby to more accurately aline said forks for engagement in straddling relation over the forward portions of the stripper bars 49 as such forks turns about the sprockets 41.

*Operation*

With the described machine supported at the rear of a tractor in the manner illustrated, and with the skids 8 running on opposite sides of the crop row 10, the machine advances along such row, with the pick-up fingers 37 engaging beneath the matted and entangled vines on opposite sides of the longitudinal median line of said row. These matted and entangled vines ride up the fingers 37, being then cut or split lengthwise of the row by the rotary disc 11, and almost simultaneously the upstanding axis, rotary cutter 20 severs such vines from the roots.

These split-apart vines, as severed from the roots, are carried rearwardly and upwardly on the fingers 37 by the vine feeding forks 48 of the conveyors 39; the deflector 34 then acting to deflect the vines laterally on opposite sides of the crop row 10. This deflection is assisted by the rearwardly divergent deflector bars 38 so that after passage of the machine the vines lie in windrows to opposite sides of the crop row 10, whereby the beneath-ground crop in such row may then be dug and harvested with relative ease.

The splitter plate 35 above the deflector hood 34 assures against any entanglement of the vines over the hood, and the stripper bars 49 prevent the vines from riding upwardly with the feeding forks 48 to entangle about the cross shaft 44 or adjacent parts.

The arrangement of the pick-up fingers 37 and stripper bars 49, in relation to the deflector hood 34, is such that the split-apart halves of the entangled strip of vines tends to feed cleanly to the rear, being deflected by said hood 34 and bars 38 laterally outward in the manner previously described.

The described machine functions smoothly, effectively, and positively, to the accomplishment of the desired end; thus providing a very reliable and practical device for mechanically removing the vines along a crop row from beneath-ground crops.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. In a vine cutting machine for row crops arranged for forward movement along a row and which machine includes a vine cutting mechanism operative to both split the vines lengthwise and sever them from the roots; a vine deflecting mechanism on the machine operative to deflect the split and severed vines laterally outward of the row, said vine deflecting mechanism being disposed in the main to the rear of the vine cutting mechanism and including a longitudinal forwardly tapering deflector hood having flaring sides, longitudinal laterally spaced vine pick-up fingers mounted in connection with and projecting forwardly from adjacent the front of the deflector hood, an endless driven conveyor mounted on the machine above each of the pick-up fingers, said conveyors each including a lower run extending lengthwise of and above the corresponding pick-up finger, and vine feeding elements projecting outwardly from each conveyor and, when in said lower run, traveling rearwardly along said corresponding finger in vine feeding relation; said vine feeding elements being in the form of forks open lengthwise of the machine, there being longitudinal stripper bars in spaced relation along and corresponding to said pick-up fingers; the forks straddling both the fingers and stripper bars when feeding vines between the same.

2. In a vine cutting machine for row crops arranged for forward movement along a row and which machine includes a vine splitting mechanism and a cutter to horizontally sever the vines from the roots and vine feeding elements for feeding vines rearwardly; a deflector hood mounted to the rear of said cutter but including a forward portion overhanging the same, said deflector hood tapering forwardly and including outwardly and downwardly flaring sides, and longitudinal vine pick-up elements projecting forwardly from the sides of the deflector hood and on opposite sides of said vine splitting mechanism, said vine feeding elements being in the form of forks open lengthwise of the machine, and longitudinal stripper rods in spaced relation above and corresponding to said pick-up fingers; the forks straddling both the fingers and stripper bars when feeding vines between the same.

3. In a vine cutting machine for row crops arranged for forward movement along a row and which machine includes a vine cutting assembly operative to both cut through the vines vertically and lengthwise of a row and sever the vines from the roots; a vine deflecting assembly mainly to the rear of said cutting assembly operative to deflect the cut and severed vines laterally to opposite sides of the crop row; said last named assembly including a centrally disposed, longitudinally extending vine deflector having flaring sides, webs upstanding from opposite side edges of the deflector, and longitudinal vine pick-up fingers mounted on said webs and projecting forwardly of the deflector at a forward and downward incline.

4. In a vine cutting machine for row crops arranged for forward movement along a row and which machine includes a vine cutting assembly operative to both cut through the vines vertically and lengthwise of a row and sever the vines from the roots; a vine deflecting assembly mainly to the rear of said cutting assembly operative to deflect the cut and severed vines laterally to opposite sides of the crop row; said last named assembly including a centrally disposed, longitudinally extending vine deflector having flaring sides, webs upstanding from opposite side edges of the deflector, and longitudinal vine pick-up fingers mounted on said webs and projecting forwardly of the deflector at a forward and downward incline; longitudinal stripper bars spaced above and corresponding to said vine pick-up fingers, and endless conveyors on the machine including projecting forks which in one run of the conveyors straddle adjacent stripper bars and fingers from above and travel rearward in vine feeding relation.

RALPH W. GUNDERSON.

REFERENCES CITED

The following references are of record in the file of this patent:

UNITED STATES PATENTS

| Number | Name | Date |
|---|---|---|
| 1,099,414 | Williams | June 9, 1914 |
| 1,241,325 | Angus | Sept. 25, 1917 |
| 1,258,456 | Pulver et al. | Mar. 5, 1918 |
| 1,301,829 | Foutz | Apr. 29, 1919 |
| 1,339,924 | Gardner | May 11, 1920 |
| 1,947,556 | Krause | Feb. 20, 1934 |
| 2,427,313 | Thomson | Sept. 9, 1947 |
| 2,494,757 | Hansen | Jan. 17, 1950 |
| 2,538,121 | Piel et al. | Jan. 16, 1951 |